United States Patent
Lekutai

(10) Patent No.: US 11,228,883 B2
(45) Date of Patent: *Jan. 18, 2022

(54) VEHICLE-TO-EVERYTHING (V2X) COMMUNICATION ASSISTED MEDICAL DEVICES

(71) Applicant: T-Mobile USA, Inc., Bellevue, WA (US)

(72) Inventor: Gaviphat Lekutai, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,855

(22) Filed: Jun. 2, 2020

(65) Prior Publication Data

US 2021/0377706 A1 Dec. 2, 2021

(51) Int. Cl.
| | |
|---|---|
| *H04W 4/00* | (2018.01) |
| *G08G 1/123* | (2006.01) |
| *H04M 11/00* | (2006.01) |
| *H04W 72/00* | (2009.01) |
| *H04W 4/40* | (2018.01) |
| *H04W 80/02* | (2009.01) |
| *H04W 4/06* | (2009.01) |

(Continued)

(52) U.S. Cl.
CPC .............. *H04W 4/40* (2018.02); *H04W 4/06* (2013.01); *H04W 4/90* (2018.02); *H04W 16/14* (2013.01); *H04W 80/02* (2013.01)

(58) Field of Classification Search
CPC ........... H04W 4/40; H04W 4/90; H04W 4/06; H04W 16/14; H04W 80/02

USPC .......................................................... 370/329
See application file for complete search history.

(56) References Cited

U.S. PATENT DOCUMENTS

| | | | |
|---|---|---|---|
| 6,999,471 B1 * | 2/2006 | Frazer | H04J 3/1682 370/229 |
| 8,913,544 B2 | 12/2014 | Akita et al. | |
| 9,763,267 B2 | 9/2017 | Abraham et al. | |

(Continued)

OTHER PUBLICATIONS

A. K. Ligo and J. M. Peha, Spectrum for V2X Allocation and Sharing, in IEEE Transactions on Cognitive Communications and Networking, vol. 5, No. 3, pp. 768-779, Sep. 2019.*

(Continued)

*Primary Examiner* — Mark G. Pannell
(74) *Attorney, Agent, or Firm* — Han Santos, PLLC

(57) ABSTRACT

Techniques are described herein for using improving road safety use case in a vehicle-to-everything (V2X) communication environment. The techniques include exchanging of vehicle attribute data that include unique information about mounting vehicles, unique identification of medical devices that are in vehicle-to-passenger (V2Pa) communication with the embedded device, and the like. In an embodiment, a receiving vehicle-embedded device correlates the received vehicle attribute data relative to its stored vehicle attribute data and, based upon this correlation, the receiving device implements an adjustment in V2X communication configuration. The adjustment, for example, includes sending alerts to the medical devices, reallocating currently used bandwidth of an accessed shared spectrum to support the V2V communication with an emergency vehicle, etc.

20 Claims, 6 Drawing Sheets

(51) Int. Cl.
*H04W 16/14* (2009.01)
*H04W 4/90* (2018.01)

(56) References Cited

U.S. PATENT DOCUMENTS

| | | | |
|---|---|---|---|
| 10,165,574 B2 | 12/2018 | Baghel et al. | |
| 10,349,442 B2 | 7/2019 | Baghel et al. | |
| 10,383,114 B2 | 8/2019 | Jiang et al. | |
| 10,477,371 B2 | 11/2019 | Gulati et al. | |
| 10,548,184 B2 | 1/2020 | Obaidi | |
| 10,575,083 B2 | 2/2020 | Perianu et al. | |
| 10,580,291 B1 | 3/2020 | Rothenberg et al. | |
| 10,757,711 B2 | 8/2020 | Lee et al. | |
| 2003/0165200 A1* | 9/2003 | Pugel | H04N 21/4348 375/316 |
| 2004/0203815 A1* | 10/2004 | Shoemake | H04W 72/02 455/450 |
| 2006/0146775 A1* | 7/2006 | Song | H04L 47/14 370/338 |
| 2007/0064606 A1* | 3/2007 | Uh | H04L 41/0896 370/230 |
| 2011/0228779 A1* | 9/2011 | Goergen | H04L 49/40 370/392 |
| 2012/0063373 A1* | 3/2012 | Chincholi | H04L 5/143 370/281 |
| 2013/0203378 A1* | 8/2013 | Vos | H04W 4/24 455/406 |
| 2014/0162667 A1* | 6/2014 | Mueck | H04W 72/04 455/450 |
| 2015/0111569 A1* | 4/2015 | Gupta | H04W 8/08 455/426.1 |
| 2016/0234031 A1* | 8/2016 | Rabii | H04L 12/185 |
| 2016/0234032 A1* | 8/2016 | Rabii | H04L 65/80 |
| 2017/0111921 A1* | 4/2017 | Fan | H04W 72/1242 |
| 2017/0272995 A1* | 9/2017 | Kim | H04W 4/24 |
| 2018/0255611 A1 | 9/2018 | Li et al. | |
| 2018/0351844 A1* | 12/2018 | Viox | H04W 24/08 |
| 2020/0145293 A1 | 5/2020 | Terazawa et al. | |
| 2020/0196325 A1 | 6/2020 | Patil et al. | |
| 2020/0245115 A1 | 7/2020 | Dorrance et al. | |
| 2021/0089026 A1 | 3/2021 | Bender et al. | |

OTHER PUBLICATIONS

U.S. Appl. No. 15/930,286 Notice of Allowance dated Sep. 2, 2021, 53 pages.
U.S. Appl. No. 15/930,278, Notice of Allowance dated Aug. 31, 2021, 40 pages.

* cited by examiner

VEHICLE-TO-EVERYTHING (V2X) COMMUNICATION ASSISTED MEDICAL DEVICES

BACKGROUND

Vehicle communication systems may include vehicle-to-everything (V2X) communication software or programs that can facilitate transmission of information from a vehicle to any entity that may affect the vehicle and vice versa. V2X communication software generally resides at least partially in a memory unit of a vehicle's native computing system such as a vehicle's electronic control unit (ECU) and enables the vehicle to act as a communication node when communicating with various entities. For example, vehicles can communicate with other vehicles, infrastructures (e.g., traffic lights), passengers and/or pedestrians with mobile devices, networks, and/or so forth. Thus, V2X communication can include components such as vehicle-to-vehicle (V2V), vehicle-to-infrastructure (V2I), vehicle-to-pedestrian (V2P), and vehicle-to-network (V2N) communications.

Several innovative automotive use cases using V2X communication have emerged during the last years and many more will come in the following years. Some of the innovative automotive use cases include different safety-related V2X services such as autonomous driving, car platooning, control loss warning, forward collision warning, vehicle status warning, etc. With new features of connected vehicles, the automotive use cases may extend and adjust with continuous developments of these new features.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
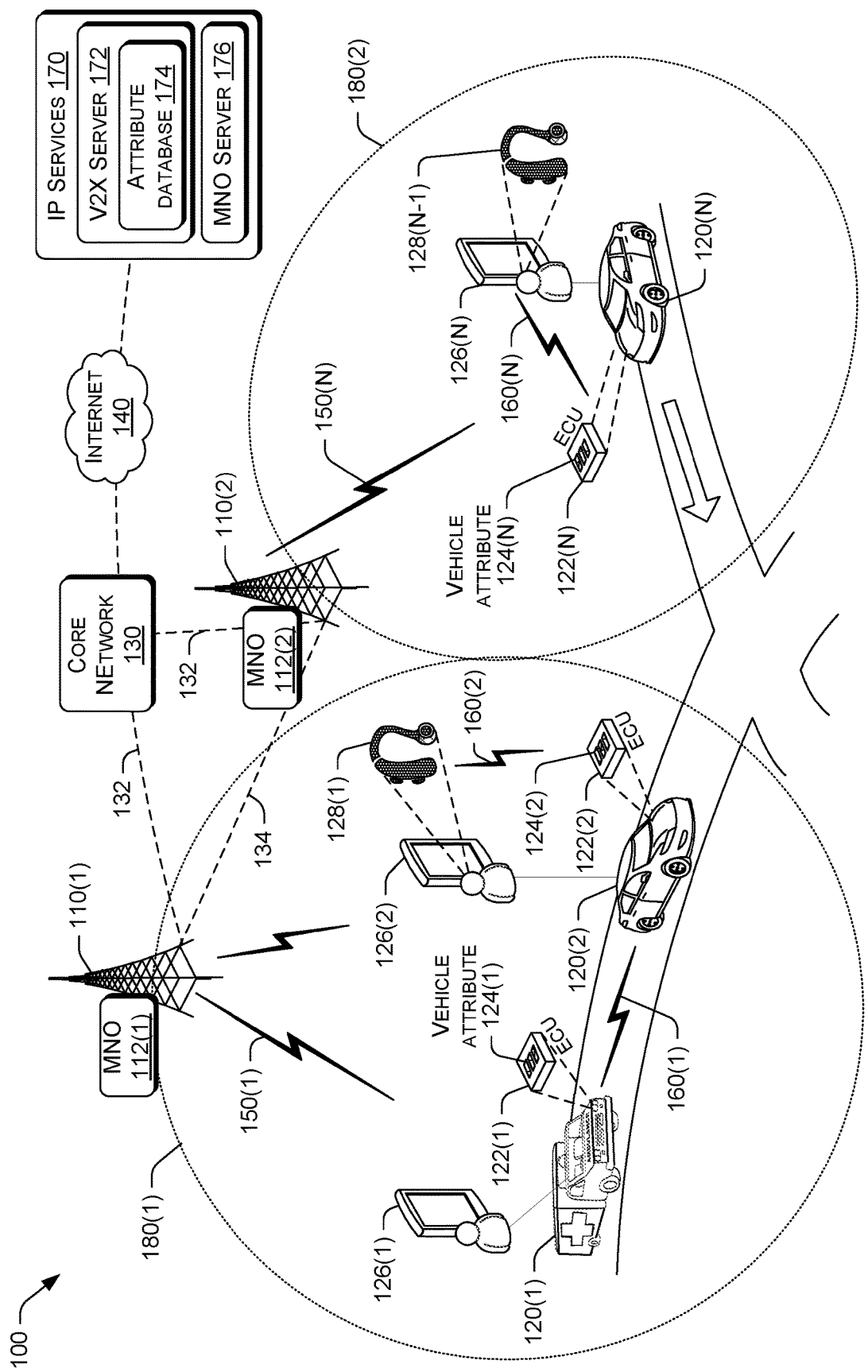
FIG. 1 illustrates an example of a network architecture that facilitates wireless communications between vehicles equipped with devices for V2X communications.

This disclosure is directed to techniques for improving a road safety use case in a vehicle-to-everything (V2X) communication environment. In example embodiments, road safety use case includes a road and traffic solution that includes sharing of locations, driving intentions, and exchanging of data through V2X communications to avoid collisions/accidents. To improve road safety use case, a vehicle needs to be aware of onboard passenger/driver conditions, and to be aware of features/characteristics of another vehicle to render road-safety services. For example, a first vehicle detects the presence of a deaf passenger/driver based upon a connected wireless communication medical device, and further detects a classification of a second vehicle that is about to cross paths with the first vehicle. In this example, and in a case where the second vehicle is classified as an emergency vehicle that is broadcasting an alert/warning in active pursuit of an emergency situation, the first vehicle prioritizes allocating of direct communication channel bandwidth to support vehicle-to-passenger (V2 Pa) and V2V communications with the wireless communication medical device and the emergency vehicle, respectively. Priority in allocating of the channel bandwidth ensures road-safety services since the first vehicle will be able to immediately notify the connected medical device of the alert/warning and further, the first vehicle will be able to use enough channel bandwidth to support bandwidth requirements of the V2V communication with the emergency vehicle. As described herein, medical device includes a user equipment (UE) or other wireless electronic instruments that can be of aid to a person subject to physical impairment and/or who is physically vulnerable. Example medical devices include hearing aids for deaf and/or blind, a pulse-oximeter for a person with a heart disease, a UE with an installed application that variously performs functions of hearing aid, pulse-oximeter, heart rate monitor, and/or other biological sensor(s), or other personal devices that collect biological information, and the like.

In example embodiments, a vehicle-embedded wireless communications device (or embedded device) is configured to: associate to its system the medical devices that are in V2 Pa communications with the embedded device; prioritize allocation of a shared spectrum bandwidth for relaying alert/warning information to the associated medical devices; and increase a direct communication channel bandwidth to support the bandwidth requirements of the V2V communication with another device. The increasing of the channel bandwidth includes aggregating a bandwidth of a licensed band with an available bandwidth of the shared spectrum bandwidth, and reallocating a currently used bandwidth of the shared spectrum bandwidth if the aggregation is insufficient to support the bandwidth requirements of the V2V communication. As described herein, the device is hosted by a vehicle's platform for simplicity of presentation, and different other platforms such as an article of clothing, a pedestrian, or a standalone paging instrument can host the device without departing from the scope of the invention.

In example embodiments, the embedded device includes a memory register that stores vehicle attribute data such as unique identifications of the medical device(s) that are in V2 Pa communication with the embedded device, a vehicle identification number (VIN) of the hosting vehicle, a vehicle classification (e.g., emergency vehicle, civilian passenger vehicle) that is associated with the VIN, current hosting vehicle's location, and the like. Unique identifications of the medical devices include a media access control (MAC) address of the hearing aid or pulse-oximeter, device identification (ID) for the UE that is used as medical device, and the like. In this embodiment, the embedded device periodically broadcasts the stored vehicle attribute data through a cellular network interface or through a direct communication channel interface to share the data with another vehicle and/or with other data stores, such as a network server (e.g., a centralized V2X communication server).

In an example embodiment, the embedded device parses the vehicle attribute data that it receives from the network server or through the direct communication channel interface. In this embodiment, the receiving embedded device utilizes its own vehicle attribute data and the received vehicle attribute data as bases for adjusting the receiving embedded device's V2X communication configuration to improve road-safety services. For example, a private vehicle hosting the embedded device receives the vehicle attribute data from a broadcasting vehicle that is classified as an emergency vehicle (e.g., ambulance). The vehicle classification, for example, may be parsed by the receiving embedded device from the VIN of the received vehicle attribute data. In this example, the receiving embedded device may utilize current location of the emergency vehicle to determine a timing for initiating V2V communications. The initiating of the V2V communications with the emergency vehicle is based on the calculation that the two vehicles will cross paths, and that the V2V communication is needed to avoid collision or accident. In this regard, the initiating and the establishing of the V2V communications include the adjustment in the V2X communication configuration of the receiving embedded device.

With the established V2V communication, the receiving embedded device further prioritizes the allocating of an available bandwidth of the accessed shared spectrum to support the V2V communication with the emergency vehicle. In example embodiments, and where the available bandwidth of the accessed shared spectrum is insufficient, the receiving embedded device aggregates at least one licensed band of embedded device's network provider with the available bandwidth to support bandwidth requirements of the established V2V communication. In a case where the aggregation between the at least one licensed band and the available bandwidth is still insufficient, the receiving embedded device reallocates currently used bandwidth of the accessed shared spectrum to support the V2V communication with the emergency vehicle. For example, consider a situation where the receiving embedded device is currently using a portion of the shared spectrum bandwidth for performing a V2I communication with surrounding traffic lights. In this example, reallocating the currently used bandwidth includes canceling of the V2I communication with the traffic lights, and reallocating/redistributing the previously used bandwidth to support the V2V communication with the emergency vehicle.

In an example embodiment, the embedded device includes a wireless communication electronic device that is integrated to a vehicle's platform as an electronic control unit (ECU) or as a portable computing system. In this embodiment, the device is associated with a particular vehicle that performs, for example, V2X communication with another vehicle. In this example, the other vehicle may also include a separate device that is integrated to its platform. The device may include hardware circuit components that can process data, perform transmission and reception of data through cellular network connection and/or direct communication, detect device location, and the like. Further, the device may be configured to be a subscriber of one or more mobile network operators (MNOs) or wireless telecommunications network service providers (WTNSPs). The subscription may be preconfigured during vehicle manufacture and can be adjusted from time to time such as, for example, when the device changes MNOs/WTNSPs and/or adds network subscription features.

As described herein, V2X communication may encompass two separate interfaces. V2X communication may use a first interface (network interface) such as, for example, a Long Term Evolution (LTE) interface (Uu) for cellular network communications. V2X communication may also use a second interface (direct communication channel interface) such as, for example, an LTE V2X interface or new radio (NR) V2X interface (PC5 interface) for direct communications. The direct communication channel interface utilizes the shared spectrum such as 5.9 GHz unlicensed band. In some embodiments, V2X communication may utilize both interfaces at the same time. For example, V2N communication may use a vehicle's cellular network connection in a traditional manner over the Uu, which can serve as a logical interface between the vehicle and a base station. At the same time, the vehicle may perform V2 Pa communication with the medical devices through the PC5 interface. In this example, the V2N communication over the Uu is independent of the V2 Pa communication over the PC5 interface.

The techniques described herein may be implemented in a number of ways. Example implementations are provided below with reference to the following figures.

Example Network Architecture

FIG. 1 illustrates an example architecture of a wireless communications system such as an evolved packet system 100. The evolved packet system 100 may include base stations 110 that can be associated with MNO 112, vehicles 120 with integrated devices 122, vehicle attributes 124, passenger user equipment (UE) 126, a passenger or driver's hearing aid 128, core network 130, internet 140, and Internet Protocol (IP) services 170 including a V2X communication server 172, an attribute database 174, and a MNO service server 176. Each of the devices 122 and/or UEs 126 may connect to the base station 110 through a radio interface 150. Each of the devices 122, UEs 126 and/or hearing aids 128 may establish and/or perform V2X communications through a direct communication channel interface 160 such as PC5 interface. Further, each of base stations 110 may provide cellular wireless communications within respective geographic coverage area 180. In an example embodiment, and for improving road safety-services in a V2X communication environment, the vehicles 120 periodically broadcast the data that are stored in their corresponding vehicle attributes 124 in order to learn the conditions of onboard passengers/drivers and to obtain information on the features/classifications of each vehicle within a particular V2X communication geographic area. In this embodiment, each vehicle 120 may adjust its V2X communications configuration based on the information from the exchanged data. For example, the adjustment in the V2X communications configuration includes prioritizing allocation of a channel bandwidth in the direct communication channel interface 160 to alert onboard physically impaired passengers/driver, and to support V2V communications with another vehicle in order to avoid collision/accident.

Device 122 may include an electronic device that can be installed and/or integrated into a vehicle 120's computing system or platform. Device 122 may include hardware circuit components such as transceivers, microcontroller, and memory components to establish V2X communication with another device, UE, and/or the hearing aid 128 through the direct communication channel interface 160. Device 122 may also perform cellular V2X communications with another device and/or UE through the radio interface 150. In an example embodiment, device 122 includes the vehicle attribute 124 that stores data of the vehicle to which the device 122 is embedded. The device 122 may further stores vehicle attribute data that are received from the V2X communication server 172 or broadcasted through the direct communication channel interface 160

Vehicle attribute 124 may include one or more memory register components that store information about the hosting vehicle and other vehicles. For example, the information includes the VIN of the vehicle that is hosting the device 122, unique identification of wireless connected devices including the hearing aid 128, current vehicle location, target destination for emergency vehicle that is in active pursuit of an emergency situation, and the like. The VIN is unique for each vehicle and the VIN may be associated with vehicle classifications such as emergency vehicle, private vehicle, public utility vehicle, train, semi with trailer, etc. The unique identifications of the wireless connected devices such as the MAC address of the hearing aid 128 can be used as reference for determining the presence of a physically impaired passenger and/or driver in the hosting vehicle. The current vehicle location and the target destination may be used as timing references for initiating V2V communication when the receiving vehicle and broadcasting vehicle are calculated to cross paths based on their respective locations and target destinations. Other information such as current allocation of bandwidth (e.g., V2P, V2 Pa, V2I, V2N, and/or V2V communications) may be stored in the vehicle attribute 124. In an example embodiment, the device 122 periodically broadcasts the data in the vehicle attribute 124 through the V2X communication server 172 or through the direct communication channel interface 160 to alert another vehicle, pedestrian, passenger, or entity.

UE 126 may include or be embodied by a cellular phone, a smart phone, a session initiation protocol (SIP) phone, a laptop, a personal digital assistant (PDA), a satellite radio, a global positioning system, a multimedia device, a video device a camera, a game console, a tablet, a smart device, a wearable device, or any other similar functioning device. UE 126 may also be referred as a station, a mobile station, a subscriber station or unit, a wireless unit, a mobile device, a wireless device, an access terminal, a handset, a user agent, a mobile client, or some other suitable terminology. In some embodiments, the UE 126 may use the radio interface 150 to establish cellular network communications with another UE 126, device 122, and/or the hearing aid 128. The UE 126 may also use the direct communication channel interface 160 to establish and to perform V2X communication with another UE 126, device 122, and/or hearing aid 128. In some embodiments, the UE 126 includes one or more applications that perform the functions of the hearing aid 128. In this embodiment, a device ID of the UE 126 is used as a reference for determining presence of a physically impaired passenger or driver as described herein. Further, the UE 126 can directly broadcast its current location to the devices 122 and other UEs to indicate its current function/use as a medical device.

Hearing aid 128 may include a wireless communication medical device that can amplify incoming sounds. Hearing aid 128 may include miniature transceiver and processor components to establish V2 Pa communication with the device 122. The hearing aid 128 may include unique identification such as the MAC address (or a particular device identification) that can be stored by the device 122 in the vehicle attribute 124. The MAC address in the vehicle attribute 124 may indicate the presence of the physically impaired passenger or driver in the vehicle 120. The MAC address may also serve as reference for forwarding of alert/notifications that are received by the device 122. For example, the vehicle 120(2) may be driven by a person who is wearing the hearing aid 128(1). In this example, the hearing aid 128(1) engages in V2 Pa communication with the embedded device 122(2), and the MAC address of the hearing aid 128(1) is stored in the vehicle attribute 124(2). In an example embodiment, the parsing of the hearing aid 128(1)'s MAC address in the received vehicle attribute 124(2) indicates a handicap vehicle with an onboard physically impaired passenger/driver and in this regard, the implementation of the V2X communication over the handicap vehicle is adjusted accordingly as described herein.

V2X communication server 172 may include general-purpose computers or other electronic devices that are capable of receiving input, processing the input, and generating output data. V2X communication server 172 may provide an integrated messaging and/or control of cellular V2X communications between UEs 126, devices 122, medical devices, or a combination thereof, using the radio interface 150. In an example embodiment, the V2X communication server 172 stores received vehicle attribute data into the attribute database 174. In this embodiment, the V2X communication server 172 utilizes the received vehicle attribute data from the different embedded devices 120 to improve the road-safety services in the V2X communication environment. For example, and using core network 130 capabilities, the V2X communication server 172 may identify current location of a particular emergency vehicle that is in pursuit of an emergency situation and further identifies the vehicles that are present along a projected route of the particular emergency vehicle. In this example, and upon receiving of the vehicle attribute data from the emergency vehicle, the V2X communication server 172 may send notifications to alert the surrounding vehicles along the projected route. In an example embodiment, the sending of notifications include targeting of vehicles that are determined to carry physically impaired passenger(s) or driver(s) based upon their corresponding vehicle attribute 124.

Attribute database 174 may include memory servers that store data from vehicle attributes 124 of the devices 122. In an example embodiment, the attribute database 174 is periodically updated due to periodic transmissions by the vehicles 120 of changes and updates in their corresponding vehicle attributes 124. For example, the vehicle-embedded device 122(2) may be driven sometimes by a person wearing the hearing aid 128 that engages in V2 Pa communication with the device 122(2) or in other situations, the person driving is not physically impaired. In this example, the device 122 may periodically send its updated vehicle attribute data to the V2X communication server 172. In another example, an emergency vehicle may be in active pursuit of an emergency situation or at other times, the emergency vehicle is not actively pursuing an emergency and acts like an ordinary car travelling in the V2X communication geographic area. In this example, the emergency vehicle may periodically update the V2X communication server 172 of the changes in the vehicle attribute data. In these examples, the V2X communication server 172 utilizes the attribute database 174 to regularly update and/or alert the devices 122 over a particular geographic area.

Base stations 110 in the evolved packet system 100 may be collectively referred to as Evolved Universal Mobile Telecommunications System (UMTS) Terrestrial Radio Access Network (E-UTRAN) that can be connected to the core network 130 through backhaul links 132 (e.g., S1 interface). Base stations 110 may perform transfer of user data, mobility control functions such as handover and dual connectivity, inter-cell interference coordination, connection setup and release, load balancing, distribution for non-access stratum (NAS) messages to UEs, NAS node selection, paging, positioning, delivery of warning messages, detecting current locations of devices 122, UEs 126, and/or the hearing aids 128. Further, base stations 110 may communicate directly or indirectly with each other over a backhaul link 134 (e.g., X2 interface). The backhaul link 134 may be wired or wireless.

Base station 110 may be deployed in a network cell to cover, for example, the geographic coverage area 180. Base station 110 may use different licensed bands, a particular amount of transmitting power, a specific antenna configuration, and the like, to cover the geographic coverage area 180. The licensed bands may be taken from a radio spectrum that is licensed to the MNO 112, which can be associated with the base station 110. In an embodiment, the base station 110 may be configured to support in parallel the use of a first licensed band in the radio interface 150 and the use of an aggregated second licensed band in the direct communication channel interface 160. In this embodiment, the second licensed band is aggregated with the shared spectrum to support bandwidth requirements of the V2X communication as described herein.

MNO 112 may include a provider of wireless communications services to an end user including radio spectrum allocation, wireless network infrastructure, and the like. MNO 112 may own/control access to the radio spectrum license, and control elements of the wireless network infrastructure that are necessary to provide the wireless communications services to subscribers (e.g., device/UE subscribers). In an example embodiment, the MNO 112 allows the licensed band of its radio spectrum to be aggregated with the available bandwidth of the shared spectrum in order to increase the bandwidth of the direct communication channel interface 160. The device 122 may avail of the aggregation when the bandwidth of the direct communication channel interface 160 is not sufficient to support the bandwidth requirement of the V2X communication as described herein.

Radio interface 150 may include the network interface that facilitates cellular network communications between the base station 110 and the devices 122 and/or UEs 126. The radio interface 150 may serve as a communication link between the base station 110 and the devices 122/UEs 126. Radio interface 150 may use one or more licensed bands of the associated MNO 112. For example, the base station 110 is associated with the MNO 112 that owns a radio spectrum license including 28 GHz/39 GHz high band, 2.5 GHz/3.5 GHz mid band, or 600 MHz/700 MHz low band. In this example, the base station 110 may use the different licensed bands in radio interface 150 during an uplink (UL) and/or downlink (DL) transmissions between the base station 110 and the devices 122/UEs 126.

Core network 130 may include one or more core network nodes that provide core network services to the devices 122 and UEs 126. Core network 130 may be an evolved packet core (EPC) network or a 5G core network that can facilitate detection of current device 122 locations, and facilitate data communications between network connected devices/UEs and the IP services 170. For example, core network 130 can provide one or more communications services (e.g., voice-over-Internet Protocol (VoIP) sessions, push-to-talk (PTT) sessions, group communication sessions, etc.) for devices 122 and/or UEs 126 that connect to the IP services 170 via the core network 130. In this example, the core network 130 may use mobility management entity (MME), serving gateway, packet data network (PDN) gateway, a home subscriber server (HSS), and other core network components to facilitate the communications with the IP services 170. MME may include hardware and/or software modules that can handle signaling related to mobility and security of E-UTRAN access. Serving gateway may deal with a user plane and can transport IP data traffic between the UE/device and the PDN gateway. PDN gateway may provide a point of interconnect between the core network and the IP services 170. HSS may include a database that include user-related and subscriber-related information. HSS may also functionalities such as mobility management, call and session establishment support, user authentication and access authorization.

Direct communication channel interface 160 may include a direct wireless communication interface that can connect the UEs, devices, medical devices, or a combination thereof, within a certain signal propagation range (e.g., within 100 meters of each other). Direct communication channel interface 160 may facilitate transmission of voice, data, and other types of content through the use of the shared spectrum or use of the aggregated band in cases where the bandwidth of the shared spectrum is insufficient. In an example embodiment, the direct communication channel interface 160 facilitates the exchange of vehicle attribute 124 data in the V2X communication environment. For example, each device 122 may use the 5.9 GHz unlicensed band shared spectrum to broadcast alert, notifications, and/or vehicle attribute. In this example, the 5.9 GHz unlicensed band shared spectrum may provide about 20 MHz of bandwidth that can be used via the direct communication channel interface 160.

IP services 170 may include an Internet, an intranet, an IP Multimedia Subsystem (IMS), and other IP services such as V2X communication services and network operator services. V2X communication services may be implemented by the V2X communication server 172 while the MNO 112 services may be implemented by the MNO service server 176.

Example Operation Scenarios

In an example embodiment, the embedded device 122(1) is broadcasting its vehicle attribute 124(1) data including, for example: a VIN that classifies the hosting vehicle as an emergency vehicle (e.g., ambulance); hosting vehicle's current location; an active status that indicates an active pursuit of an emergency situation; an emergency alert signal that is associated with the active status, and a target destination that can be used to determine the projected path between the mounting vehicle's current location and the target destination. In this embodiment, the device 122(2) receives the vehicle attribute 124(1) data via the radio interface 150 and/or direct communication channel interface 160, and the device 122(2) retransmits the received alert signal to the associated hearing aid 128(1), which is engaged in V2 Pa communication with the device 122(2). The device 122(2) may further broadcast its own vehicle attribute 124(2) data to indicate its current location relative to the projected path of the emergency vehicle—device 122(1), and to send information regarding presence of a physically impaired passenger/driver aboard the device 122(2). In an example embodiment, the device 122(2) adjusts its V2X communication configuration to address the received alert from the emergency vehicle—device 122(1). The adjustment in V2X communication configuration may include aggregation of a bandwidth of a selected licensed band with the available bandwidth of the shared spectrum, and reallocation or redistribution of currently used bandwidth to increase the bandwidth of the direct communication channel as further described below.

In an example embodiment, the device 122(2) reallocates currently used bandwidth of the shared spectrum to support the V2 Pa and V2V communications with the passenger/driver and the emergency vehicle—device 122(1), respectively. For example, the device 122(2) currently uses the bandwidth of the accessed shared spectrum for V2I and V2V communications with a traffic light and another private vehicle, respectively. In this example, the device 122(2) cancels the V2I and V2V communications, and reallocates the previously used bandwidth channels to the V2 Pa and V2V communications with the onboard passenger/driver and the emergency vehicle-embedded device 122(1), respectively.

Figure 2:
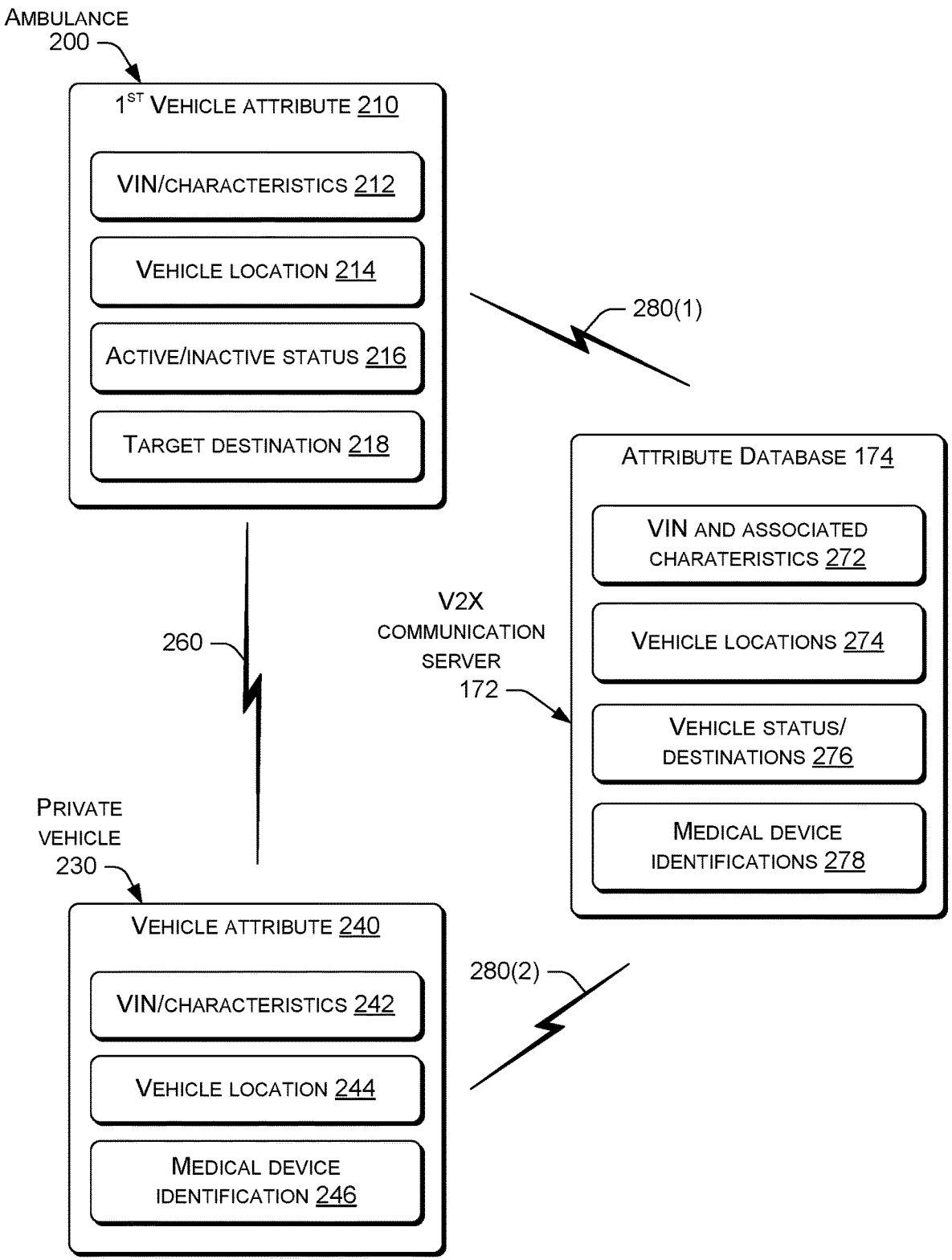
FIG. 2 is a block diagram showing an exchanging of vehicle attribute data between devices to improve a road safety use case in a V2X communication environment.

FIG. 2 is a block diagram showing an exchanging of vehicle attribute data between the embedded devices in the V2X communication environment. FIG. 2 shows a first vehicle 200 including a first vehicle attribute 210, a second vehicle 230 including a second vehicle attribute 240, and the V2X communication server 172 including the attribute database 174. Attribute database 174 may include memory registers that store "VIN and associated characteristics 272," vehicle locations 274, vehicle status and destinations 276, and medical device identifications 278. The first vehicle attribute 210 may include memory registers that store first vehicle "VIN and characteristics 212," a first vehicle location 214, an active/inactive status 216, and a first vehicle target destination 218. The second vehicle attribute 240 may store information such as second vehicle "VIN and characteristics 242," second vehicle location 244, and medical device identification 246. The first vehicle 200 and the second vehicle 230 may exchange vehicle attribute data through a PC5 interface 260 while the V2X communication server 172 may communicate with the first vehicle 200 and/or the second vehicle 230 through a Uu 280. The data that are stored in the vehicle attributes are for illustration purposes and additional information or characteristics may be added without affecting the embodiments as described herein.

"VIN and characteristics 212/242" may include stored information such as the unique VINs that are associated with international mobile subscriber identity (IMSI) of the corresponding devices that are embedded in the first vehicle 200 and the second vehicle 230, respectively. In this case, each IMSI may be associated with the unique VIN, which can be used to identify the vehicle classification (e.g., emergency vehicle, private vehicle, public vehicle), make, build, and other information. "VIN and characteristics 212/242" may further include stored vehicle characteristics such as vehicle models, colors, and build. In an example embodiment, the first vehicle 200 and the second vehicle 230 periodically transmit changes in their respective "VIN and characteristics 212/242" to the V2X communication server 172 in order to update the attribute database 174 and particularly, to update the "VIN and associated characteristics 272" that includes the VINs and corresponding classifications and characteristics of each hosting vehicle within a particular MNO/WTNSP geographic area.

Vehicle locations 214/244 may include stored information such as current locations of the wireless communication devices that are embedded in the first vehicle 200 and the second vehicle 230, respectively. Each one of the wireless communication devices may use Global Positioning System (GPS) or other navigation mechanisms to detect their respective physical locations. In an example embodiment, the first vehicle 200 and the second vehicle 230 periodically exchange vehicle attribute data, or periodically transmit their respective vehicle locations to the V2X communication server 172 to update the attribute database 174 and particularly, the vehicle locations 274 that includes the detected locations of vehicle-embedded devices within a particular MNO/WTNSP geographic area. In some embodiments, the V2X communication server 172 may receive vehicle locations data from the core network 130, which detects the physical locations of subscriber wireless communication devices through cell tracking.

Active/inactive status 216 may include information that indicates whether the emergency—first vehicle 200 is actively pursuing an emergency situation. Active/inactive status 216, for example, may include a "high" bit when the emergency—first vehicle 200 is about to attend to an emergency situation. In this example, a user may further enter a target destination in the target destination 218 where the target destination can be used to project the path or route of the emergency—first vehicle 200. In an example embodiment, the emergency—first vehicle 200 periodically broadcasts updated active/inactive status 216 towards the second vehicle 230 or periodically transmits updated active/inactive status 216 to the V2X communication server 172 in order to update the attribute database 174. Particularly, the "vehicle status and destinations 276" are updated to include the emergency vehicle status of the emergency vehicle and to include the projected path of the emergency vehicle towards the target destination.

Medical device identification 246 may include stored information such as the unique MAC identification or device identifications of the medical devices that are in V2 Pa communication with the embedded device in the second vehicle 230. For example, the second vehicle 230 engages in V2 Pa communication with the hearing aid (e.g., hearing aid 128) worn by the onboard driver/passenger. In this example, the unique MAC address of the hearing aid can be stored in the medical device identification 246 register. In another example, the UE can be used as a medical device, and the device identification of the UE is stored in the medical device identification 246 register. In an example embodiment, the second vehicle 230 periodically broadcasts updated medical device identification 246 toward the first vehicle 200 or periodically transmits changes in the medical device identification 246 register to the V2X communication server 172 in order to update the attribute database 174. Particularly, the medical device identifications 278 are updated to include the unique MAC identification addresses and/or device identifications of medical devices that are currently in V2 Pa communication with corresponding embedded wireless communication devices within a particular MNO/WTNSP geographic area.

In an example embodiment, the first vehicle 200, which is classified as an emergency vehicle based on its VIN, is broadcasting its vehicle attribute 210 data to alert the second vehicle 230 in a V2X communication environment. In this embodiment, the second vehicle 230, which is classified as a private vehicle based on its VIN, receives the broadcasted vehicle attribute 210 data and adjusts its V2X communication configuration based upon the received vehicle attribute data 210 and its own vehicle attribute 240 data. For example, the second vehicle 230 prioritizes the sending of alert/notifications to onboard medical devices (e.g., hearing aid 128) and/or establishing of V2V communication with first vehicle 200 when the second vehicle 230 is located along the projected path of the first vehicle 200, which is actively pursuing an emergency situation toward a target destination. In this example, the establishing of V2V communication may require reallocation of the currently used bandwidth of the accessed shared spectrum (e.g., 5.9 GHz unlicensed band) as further described below.

Figure 3:
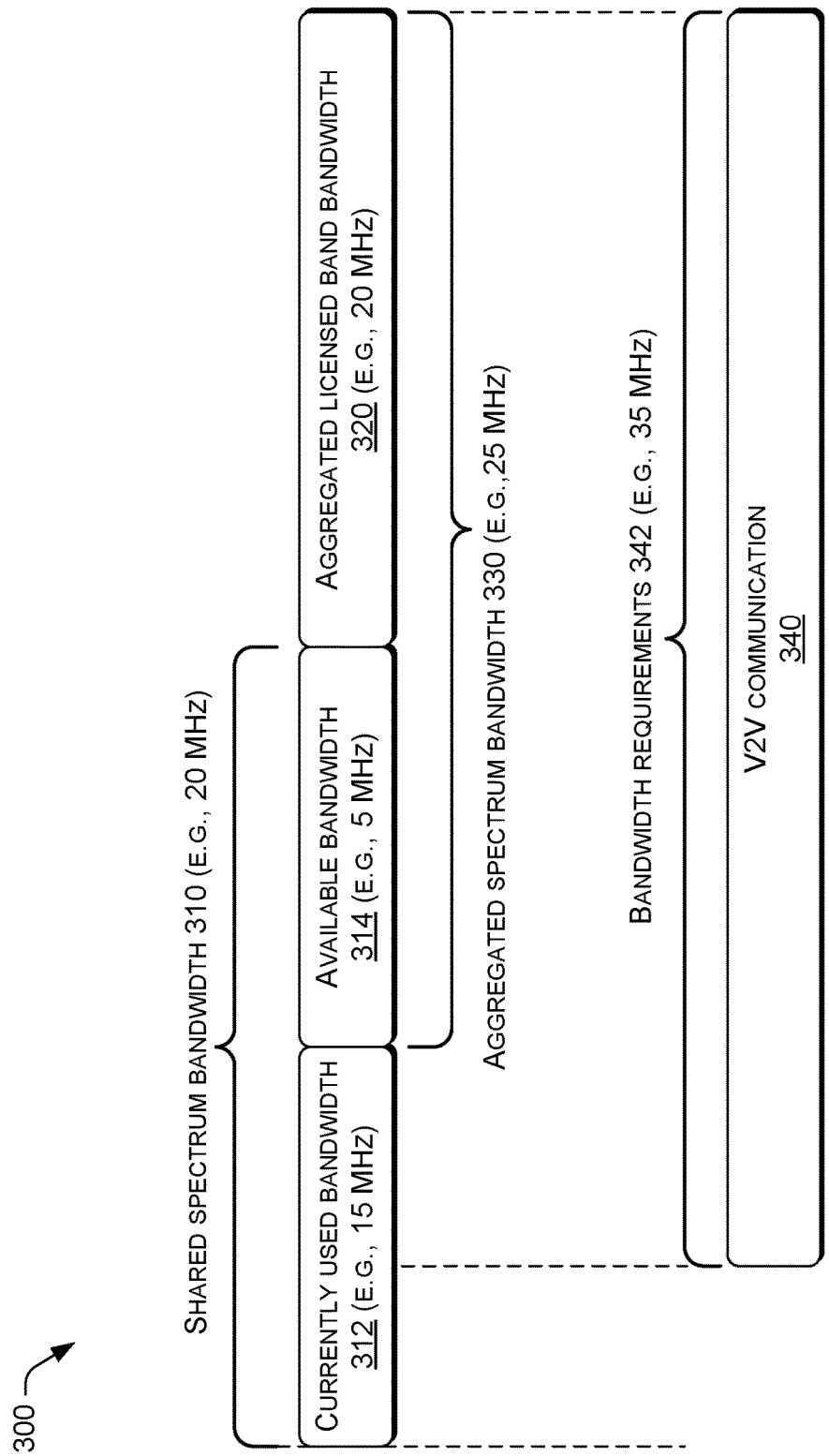
FIG. 3 is a block diagram showing a bandwidth aggregation including reallocation of a currently used bandwidth to support the V2X communication in the V2X communication environment.

FIG. 3 is a block diagram showing a bandwidth allocation 300 that includes reallocation of currently used bandwidth to support the V2X communication with a broadcasting device that is embedded, for example, in an emergency vehicle. Bandwidth allocation 300 includes a shared spectrum bandwidth 310 that is divided into a currently used bandwidth 312 and an available bandwidth 314, an aggregated licensed band bandwidth 320, and an aggregated spectrum bandwidth 330 that includes the aggregation between the available bandwidth 314 and the aggregated licensed band bandwidth 320. Bandwidth allocation 300 further shows an established V2V communication 340 including a bandwidth requirement 342 that includes the amount of bandwidth to support the established V2V communication 340.

Shared spectrum bandwidth 310 includes a bandwidth of the direct communication channel such as the 5.9 GHz unlicensed band that is used to transfer voice, data, and other types of content. Currently used bandwidth 312 includes a portion of the accessed shared spectrum bandwidth 310 that is presently utilized for transmission of voice, data, or other types of content. Available bandwidth 314 includes a portion of the accessed shared spectrum bandwidth 310 that is not utilized for sending of voice, data, or other types of content. Aggregated licensed band bandwidth 320 includes the bandwidth of the selected licensed band that can be aggregated with the available bandwidth 314 to increase the bandwidth in the direct communication transmission channel.

In an example embodiment, a private vehicle with an onboard, physically impaired driver/passenger utilizes the shared spectrum bandwidth 310 to broadcast its vehicle attribute data, which includes the identification of the medical device that is in V2 Pa communication with the device that is hosted by the private vehicle. The private vehicle may also use the shared spectrum bandwidth 310 to perform V2X communications such as performing V2I communication with a traffic light. In this embodiment, the bandwidth that are used for the V2I communication with the traffic light and for the broadcasting of the vehicle attribute data are included under the "currently used bandwidth 312" while the rest of the unused bandwidth of the accessed shared spectrum bandwidth 310 fall under the "available bandwidth 314."

In the preceding embodiment, and where the private vehicle receives an alert or notification from another vehicle such as an emergency vehicle, the private vehicle establishes V2V communication 340 with the emergency vehicle based on the received alert or notification, the current locations of the private and emergency vehicles, and on the assumption that both vehicles will cross paths and need to establish the V2V communication 340 to improve road-safety services. In this embodiment, the private vehicle may use the available bandwidth 314 to support the bandwidth requirements 342 of the established V2V communication 340. However, a low throughput/high latency may result due to small amount of available bandwidth 314 when compared to the bandwidth requirements 342. In an example embodiment, the private vehicle aggregates the licensed band bandwidth 320 with the available bandwidth 314 of the shared spectrum bandwidth 310 to generate the aggregated spectrum bandwidth 330. The aggregated licensed band is taken from the spectrum band that is licensed to private device's MNO/WTNSP. In this embodiment, the aggregated spectrum bandwidth 330 is used to support the bandwidth requirements 342 of the established V2V communication 340.

In an example embodiment, and where the aggregated spectrum bandwidth 330 is still insufficient to support the bandwidth requirements 342 as shown, the private vehicle reallocates the currently used bandwidth 312 to support the bandwidth requirements 342 of the established V2V communication 340. For example, the aggregated spectrum bandwidth 330 includes a total of 25 MHz with 15 MHz of the shared spectrum bandwidth 310 being currently used to transfer voice, data, or other types of content. In this example, and to support the bandwidth requirements 342 of about 35 MHz, the private vehicle (i.e., embedded wireless communication device) may reallocate the 15 MHz—currently used bandwidth 312 to support the established V2V communication 340.

Example Device Components

Figure 4:
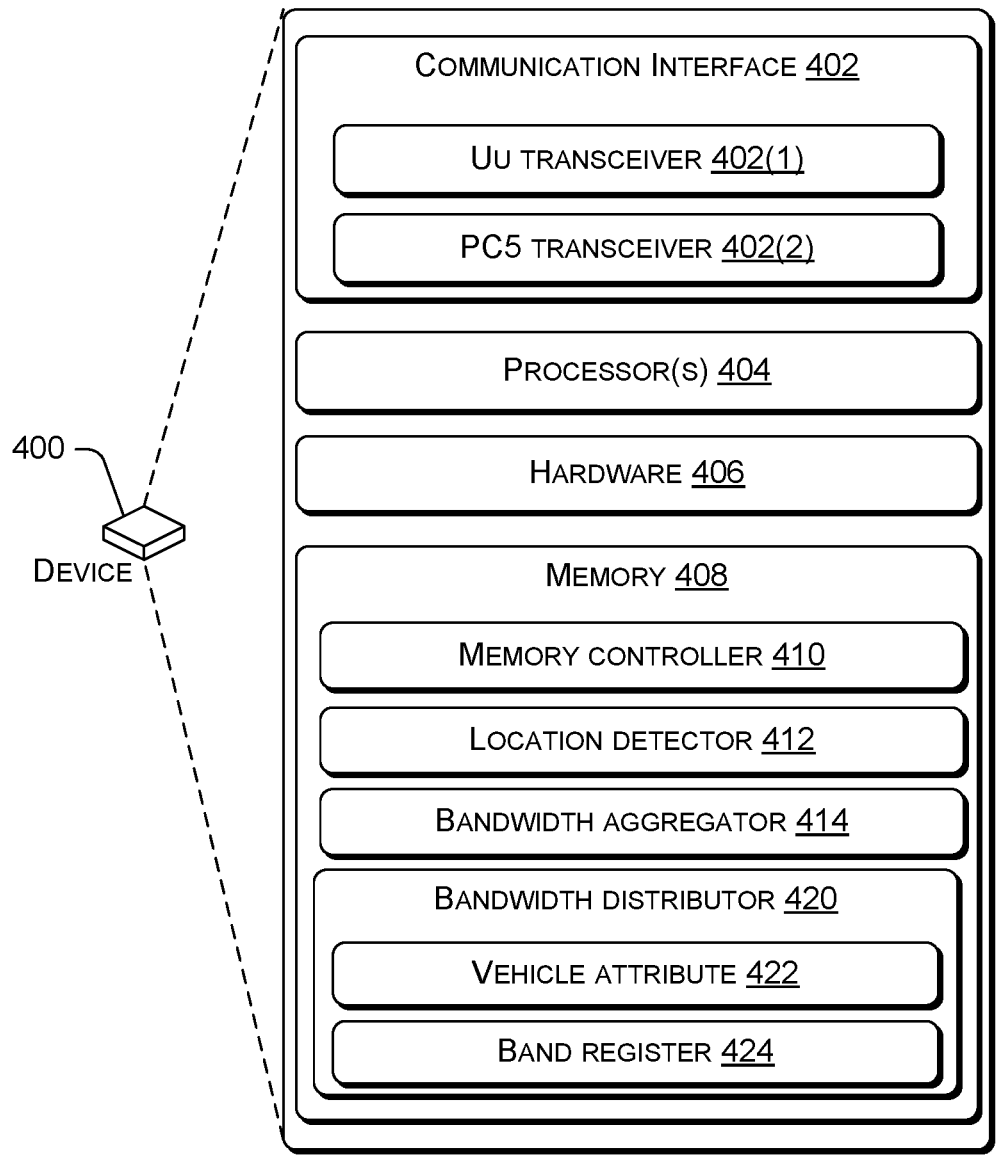
FIG. 4 is a block diagram showing various components of an illustrative device that uses the vehicle attribute data as a reference for adjusting a V2X communication configuration.

FIG. 4 is a block diagram showing various components of an illustrative device 400 that may be installed in a vehicle for V2X communication. It is noted that the device 400 as described herein can operate with more or fewer of the components shown herein. Additionally, the device 400 shown herein or portions thereof can serve as a representation of one or more of the devices 400 of the present system.

Device 400 may include a communication interface 402, one or more processors 404, hardware 406, and memory 408. The memory 408 may further include a memory controller 410, a location detector 412, a band aggregator 414, and a bandwidth distributor 420 including a vehicle attribute 422 and a band register 424.

Communication interface 402 may include a hardware circuit component that transmits and/or receives data from another device, UE, hearing aid, or base station. Communication interface 402 may include a Uu transceiver 402(1) and a PC5 interface transceiver 402(2) that facilitate wireless communications through the radio interface 150 and the direct communication channel interface 160, respectively. Each of the Uu transceiver 402(1) and the PC5 interface transceiver 402(2) may include corresponding hardware circuit components such as amplifiers, filters, equalizers, etc. that can be used to process data and/or transmit/receive data. For example, the Uu transceiver 402(1) includes hardware circuit components that facilitate cellular network communications between the device 400 and the base station 110. Similarly, in example embodiments, the PC5 interface transceiver 402(2) include separate hardware circuit components that facilitate direct communication channel communication or V2X communication between the device 400 and another device, hearing aid, and/or UE through the direct communication channel interface 160. For example, the PC5 interface transceiver 402(2) may be used to send the received alert to the hearing aid 128. In another example, the PC5 interface transceiver 402(2) may be used to broadcast the vehicle attribute 422 data of the device 400.

Processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 404 may also be responsible for executing all computer applications stored in the memory, which can be associated with common types of volatile (RAM) and/or non-volatile (ROM) memory. The hardware 406 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 408 may be implemented using computer-readable media, such as computer-readable storage media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read Only Memory (ROM), Electrically Erasable Programmable Read Only Memory (EEPROM), flash memory or other memory technology, Compact Disc-Read Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanisms. The memory 408 may also include a firewall. In some embodiment, the firewall may be implemented as hardware 406 in the device 400.

Memory controller 410 may include a hardware circuit component that enables the memory 408 to interact with the communication interface 402, processors 404, hardware 406, and other components of the device 400. In an example embodiment, memory controller 410 may facilitate aggregation of the bandwidth of the selected licensed band with the shared spectrum bandwidth, and/or reallocation of the currently used bandwidth to support V2V communication with another vehicle and particular, an emergency vehicle. The selected licensed band includes radio frequency band from a radio spectrum that is licensed to device 400's MNO/WTNSP. In another embodiment, the memory controller 410 may receive a signal from the processors 404 to initiate processing of V2X communication data and to perform the aggregation and reallocation of the bandwidth based on the processed V2X communication data. In this embodiment, the memory controller 410 may utilize the location detector 412, bandwidth aggregator 414, and the bandwidth distributor 420 in adjusting V2X communication configuration of the device 400.

Location detector 412 may include a hardware circuit component that detects present position/location and/or projected movements of the device 400 relative to current location, for example, of the broadcasting emergency vehicle and surrounding vehicles. In an example embodiment, the vehicle attribute of the broadcasting emergency vehicle includes an active status of pursuing an emergency situation, a target destination, and a projected path to the target destination. In this embodiment, the location detector 412 is used to detect the current location of the device 400 relative to the projected path and current location of the broadcasting emergency vehicle. For example, the location detector 412 may use the GPS to detect the location of the device 400. In this example, the memory controller 410 and/or the processor(s) 404 may correlate the detected location of the device 400 with the projected path, target destination, and current location of the broadcasting emergency vehicle. The processor(s) 404 may use the correlation as a reference for initiating or establishing the V2V communication with the broadcasting emergency vehicle.

Band aggregator 414 may include a hardware circuit component that selects the licensed band from the radio spectrum licensed to the device 400's MNO or WTNSP, and aggregates the bandwidth of the selected licensed band with the available bandwidth of the accessed shared spectrum. For example, the selected licensed band includes an n78 band (3.5 GHz licensed band) with a bandwidth of 20 MHz. In this example, the band aggregator 414 may aggregate the 20 MHz bandwidth of the n78 band with the available bandwidth 314 of the shared spectrum as described in FIG. 3 above. In other embodiments, the accessed shared spectrum is used as an anchor or default frequency band, and the selected licensed band (e.g., n78 band) is aggregated with the anchor band to increase the bandwidth in the direct communication channel.

Bandwidth distributor 420 may include a hardware circuit component that facilitates reallocation of the currently used bandwidth of the accessed shared spectrum. For example, the reallocation is based upon a comparison between an output of the bandwidth aggregator 414 and the bandwidth requirements of the V2V communication between the device 400 and the broadcasting emergency vehicle. The processor(s) 404 or the memory controller 410 may perform the comparison. In this example, bandwidth distributor 420 reallocates the currently used bandwidth when the aggregated bandwidth is not enough to support the V2V communication. In this example still, the bandwidth distributor 420 receives the control signal from the memory controller 410 and/or processor(s) 404 to perform the reallocation.

Vehicle attribute 422 may include a hardware circuit component that stores VIN of the vehicle to which the device 400 is embedded, vehicle characteristics associated with the VIN, vehicle location, medical device identifications such as MAC address(es) and device identifications, and vehicle attribute data from other vehicles. In an example embodiment, the memory controller 410 and/or the processor(s) 404 may utilize and correlate the data in the vehicle attribute 422 with the received vehicle attribute such as, the broadcasted vehicle attribute data from the emergency vehicle. In this embodiment, memory controller 410 and/or the processor(s) 404 send control signal to the bandwidth distributor 420 to reallocate the currently used bandwidth when the combination of the available bandwidth of the shared spectrum and the licensed band is insufficient to support the bandwidth requirement of the V2V communication as described herein.

Band register 424 may include a hardware circuit component that stores the band that is in use by the communication interface 402. In an example embodiment, band register 424 may store or pre-store the shared spectrum as anchor band for V2X communication. For example, PC5 interface transceiver 402(2) may use the 5.9 GHz unlicensed band to initially establish V2X communication. In this example, the band register 424 may store or pre-store the 5.9 GHz unlicensed band as the anchor band for the PC5 interface transceiver 402(2). In a case where one or more selected licensed bands are aggregated with the anchor band, the band register 424 may store the aggregated band that can be used in the direct communication interface.

In an example embodiment, the device 400 periodically transmits the vehicle attribute 422 data to the V2X communication server 172. Similarly, the device 400 may periodically receive broadcast signal from the V2X communication server 172 through the radio interface 150. The broadcast signal may include attributes of vehicles that are within direct communication coverage area of the device 400. For example, the device 400 receives the vehicle attribute of an emergency vehicle from the V2X communication server 172. In this example, the device 400 may correlate its current location data from the vehicle attribute 422 to the current location/target destination of the broadcasting emergency vehicle. In an example embodiment, device 400 establishes V2V communication with the emergency vehicle when the device 400 is currently located along the projected path of the emergency vehicle that is actively pursuing an emergency situation towards a target destination.

In an example embodiment, the V2X communication server 172 sends the control signal to the device 400 and other vehicles within the V2X communication environment. In this embodiment, the V2X communication server 172 also performs the selection of the one or more licensed bands to be aggregated with the shared spectrum, and reallocation of the currently used bandwidth to support the V2V communication in case of insufficient bandwidth.

Example Process

Figure 5:
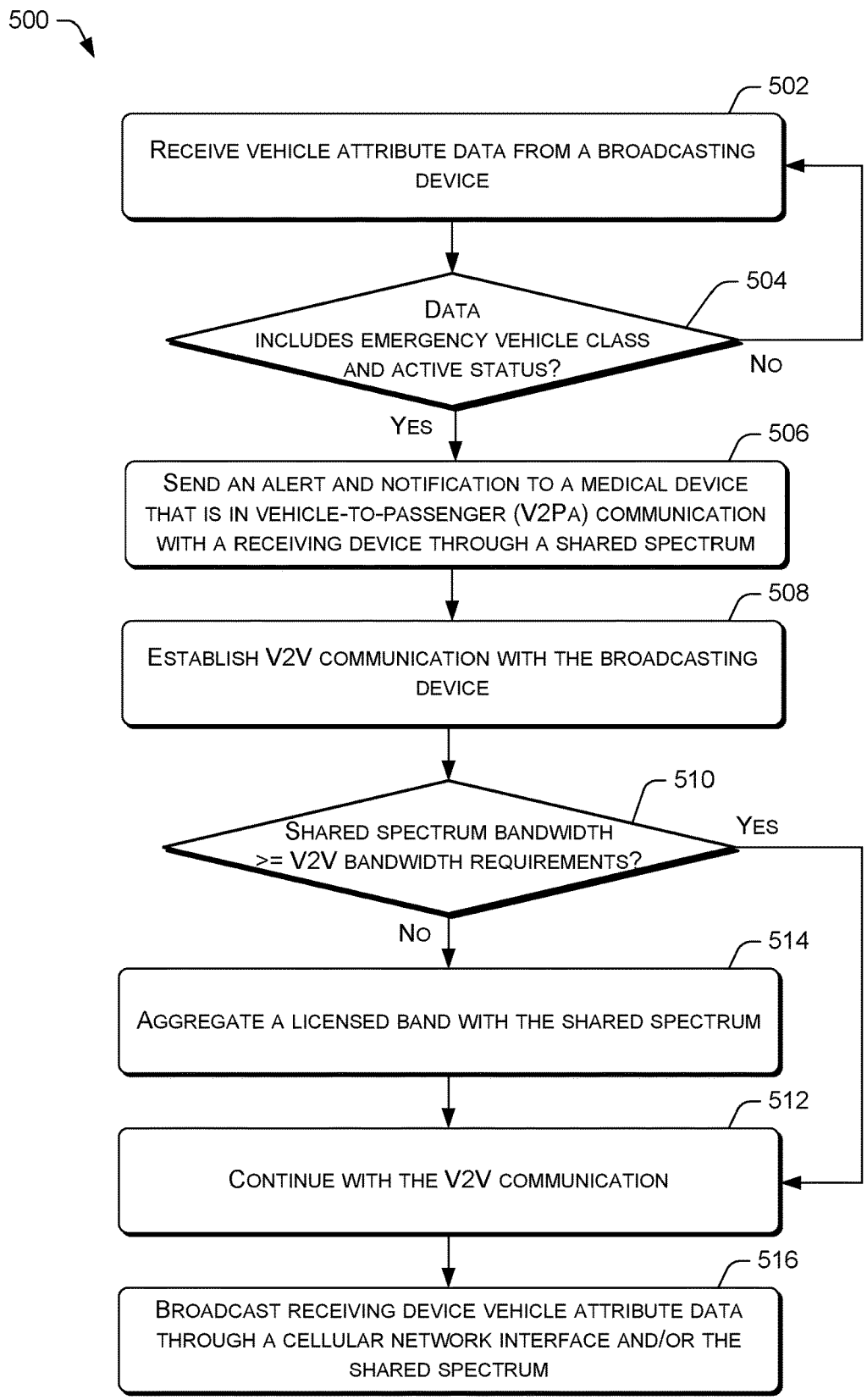
FIG. 5 is a flow diagram of an example process for improving the road safety use case in a V2X communication environment from a perspective of a device that receives the vehicle attribute data.
Figure 6:
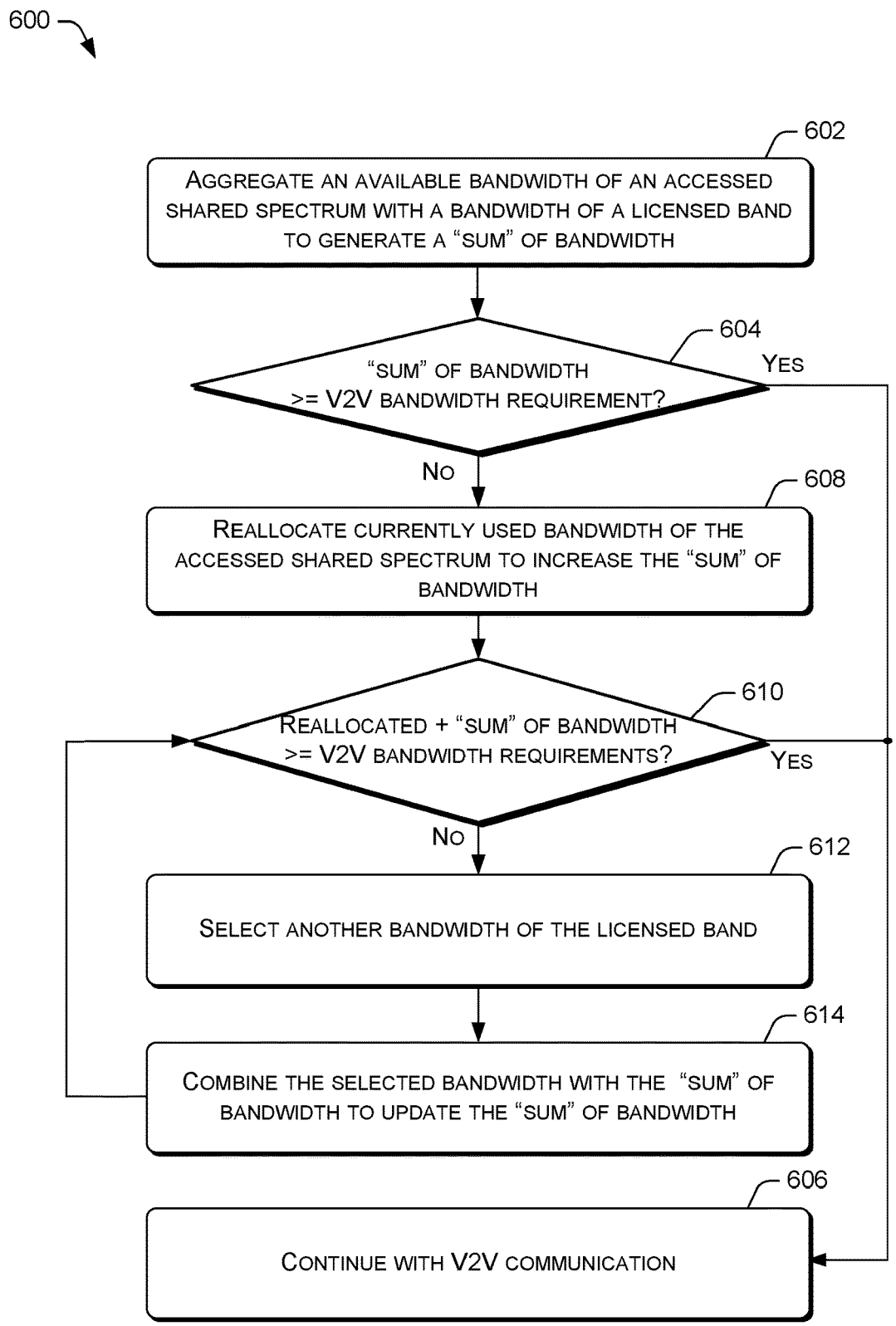
FIG. 6 is a flow diagram of an example process for reallocating currently used bandwidth of an accessed shared spectrum to support the V2X communication in the V2X communication environment.

FIGS. 5-6 presents illustrative processes 500-600 for improving road safety use case in a V2X communication environment including exchanging of vehicle attribute data, which are used as bases for adjusting each of vehicle's V2X communication configuration. The processes 500-600 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-600 are described with reference to FIGS. 1-4.

FIG. 5 is a flow diagram of an example process 500 for improving road safety use case in a V2X communication environment from the perspective of the device. At block 502, the process includes receiving a vehicle attribute data from a broadcasting device is performed. For example, an emergency vehicle 120(1) is broadcasting vehicle attribute data 124(1) data including an emergency signal (e.g., active and inactive status 216 includes "high" bit) through the direct communication channel interface 160. In this example, a private vehicle 120(2) with onboard physically impaired passenger/driver may receive the vehicle attribute through the direct communication channel interface 160 or through the radio interface 150. At decision block 504, a determination is made whether the received vehicle attribute data includes an emergency vehicle—classification and a "high" active status is performed. For example, the private vehicle 120(2) parses the received vehicle attribute 124(1) data and determines the vehicle classification based on the stored VIN. In case of emergency vehicle—classification, the received vehicle attribute data may also include "high" or "low" active and inactive status 216 bit that indicates whether the emergency vehicle is actively pursuing an emergency situation. In an example embodiment, the private vehicle 120(2) determines from the received vehicle attribute 124(1) data whether the broadcasting vehicle is an emergency vehicle and if so, that the emergency vehicle is in active pursuit of an emergency situation.

If the vehicle attribute data includes an emergency vehicle classification and is in active state of pursuing an emergency situation ("Yes" at decision block 504), then at block 506, sending an alert and notification to a medical device that is in V2 Pa communication with the vehicle-embedded device through a shared spectrum is performed. If the vehicle attribute data does not include an emergency vehicle classification or is not in active state of pursuing an emergency situation ("No" at decision block 504), then at block 502, receiving of the vehicle attribute data is performed. For example, the vehicle attribute data is periodically updated. In this example, the received vehicle attribute data at block 502 may include updates or changes from the previous vehicle attribute data.

At block 508, establishing a V2V communication with the broadcasting device is performed. For example, the private vehicle 120(2) determines a target destination and projected path of the broadcasting emergency vehicle 120(1) based on the received vehicle attribute 124(1) data. In this example, the private vehicle 120(2) may establish V2V communication with the emergency vehicle 120(1) when the current location of the private vehicle 120(2) is along the projected trajectory path of the emergency vehicle 120(1). At decision block 510, a determination is made whether a bandwidth of the shared spectrum is at least equal to a bandwidth requirement of the established V2V communication. If the bandwidth of the shared spectrum is at least equal to a bandwidth requirement of the established V2V communication ("Yes" at block 510), then control proceeds to block 512, where V2V communication continues. If the determination at block 510 is "No," then control proceeds to block 514, where at least one licensed band is aggregated with the shared spectrum. From block 514, control proceeds to block 512, and from block 512, control proceeds to block 516.

At block 516, broadcasting a receiving device vehicle attribute data is performed. For example, the private vehicle 120(2) periodically broadcasts changes or updates on its vehicle attribute data to the V2X communication server 172 or to surround vehicles, pedestrians, and/or UEs within the V2X communication environment.

FIG. 6 is a flow diagram of an example process 600 for reallocating the currently used bandwidth of the accessed shared spectrum to support the V2V communication with an emergency vehicle. At block 602, aggregating an available bandwidth of an accessed shared spectrum with a bandwidth of a licensed band to generate a "sum" of bandwidth is performed. For example, the private vehicle 120(2) accesses the 5.9 GHz shared spectrum that includes a bandwidth of 20 MHz. In this example, the private vehicle 120(2) may use 10 MHz of the 20 MHz for transmitting data or content while the other 10 MHz is unused. In this case, the unused 10 MHz include the available bandwidth that is aggregated with the bandwidth (e.g., 20 MHz) of a selected licensed band to generate the "sum" of bandwidth. At decision block 604, determining whether the combination is at least equal to a bandwidth requirement of the established V2V communication is performed. If the "sum" of bandwidth is at least equal to a bandwidth requirement of the established V2V communication ("Yes" at block 604), then control proceeds to block 606 where the V2V communication continues. If the "sum" of bandwidth is less than the bandwidth requirement of the established V2V communication ("No" at block 604), then at block 608, reallocating the currently used bandwidth of the accessed shared spectrum to increase the "sum" of bandwidth is performed. For example, the private vehicle 120(2) uses the 10 MHz of the 20 MHz bandwidth of the accessed shared spectrum for V2I communication with the traffic light. In this example, the reallocating includes cancelling the V2I communication with the traffic light and reassigning the previously used bandwidth for the established V2V communication.

At decision block 610, determining whether a combination of the reallocated bandwidth and "sum" of bandwidth is at least equal to a bandwidth requirement of the established V2V communication is performed. If the combination is at least equal to a bandwidth requirement of the established V2V communication ("Yes" at block 610), then the control proceeds at block 606 where the V2V communication continues. If the combination is less than the bandwidth requirement of the established V2V communication ("No" at block 610), then at block 612, selecting another bandwidth of the licensed band is performed. At block 614, combining the selected bandwidth with the "sum" of bandwidth to update the "sum" of bandwidth is performed. In this case, the output of block 614 is again received at decision block 610 for further processing.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage media storing computer-executable instructions that upon execution cause one or more processors to perform acts comprising:
    storing a first attribute including an identification of a medical device that is in vehicle-to-passenger (V2 Pa) communication with a first device through a shared spectrum;
    receiving a broadcast signal alert including a second attribute from a second device;
    using the shared spectrum to send a received signal alert to the medical device;
    establishing a vehicle-to-vehicle (V2V) communication with the second device; and
    comparing a bandwidth requirement of the V2V communication with an available bandwidth of the shared spectrum, wherein in response to the available bandwidth that is less than the bandwidth requirement:
        aggregating a bandwidth of a licensed band with the available bandwidth of the shared spectrum; and
        reallocating a currently used bandwidth of the shared spectrum to the V2V communication when an aggregated bandwidth between the available bandwidth and the bandwidth of the licensed band is less than the bandwidth requirement of the V2V communication.

2. The one or more computer-readable storage media of claim 1, wherein the identification of the medical device includes a media access control (MAC) address.

3. The one or more computer-readable storage media of claim 1, wherein the medical device includes a wireless communication hearing aid—medical device.

4. The one or more computer-readable storage media of claim 3, wherein the first device periodically broadcasts the first attribute to indicate a handicap vehicle—classification of a vehicle that mounted the first device.

5. The one or more computer-readable storage media of claim 1, wherein the receiving of the broadcast signal alert is performed through a cellular network interface or through a direct communication channel interface that uses the shared spectrum.

6. The one or more computer-readable storage media of claim 1, wherein the second attribute includes an emergency vehicle—classification, an active status of pursuing an emergency situation, a current location, and a target destination of the second device.

7. The one or more computer-readable storage media of claim 6, wherein the first device establishes the V2V communication with the second device when a current location of the first device is along a projected path of the second device that is travelling towards the target destination.

8. The one or more computer-readable storage media of claim 1, wherein the licensed band includes a band from a radio spectrum that is licensed to a particular mobile network operator to which the first device is a subscriber.

9. The one or more computer-readable storage media of claim 1, wherein the currently used bandwidth of the shared spectrum includes a bandwidth that is used by the first device for a vehicle-to-interface (V2I) communication with a traffic light and for a vehicle-to-pedestrian (V2P) communication with a pedestrian.

10. The one or more computer-readable storage media of claim 9, wherein the reallocating of the currently used bandwidth includes cancelling the V2I and V2P communications and allocating previously used bandwidth to the V2V communication with the second device.

11. A device, comprising:
    a communication interface that receives through a shared spectrum a broadcast signal alert including an attribute of a broadcasting device, wherein the communication interface sends a received signal alert to a medical device that is in vehicle-to-passenger (V2Pa) communication with the device and establishes a vehicle-to-vehicle (V2V) communication with the broadcasting device;
    a processor that is in communication with the communication interface, wherein the processor:
        compares a bandwidth requirement of the V2V communication with an available bandwidth of the shared spectrum;
        aggregates a bandwidth of a licensed band with the available bandwidth of the shared spectrum in response to the available bandwidth of the shared spectrum that is less than the bandwidth requirement; and
        reallocates a currently used bandwidth of the shared spectrum to support the V2V communication with the broadcasting device, wherein the reallocation of the currently used bandwidth is performed when a combination between the available bandwidth of the shared spectrum and the bandwidth of the licensed band is less than the bandwidth requirement of the V2V communication.

12. The device of claim 11, wherein the shared spectrum includes a 5.9 GHz unlicensed band.

13. The device of claim 11, wherein the medical device includes a wireless communication hearing aid—medical device.

14. The device of claim 13, wherein the communication interface is utilized to periodically broadcast an attribute of the device to indicate a handicap vehicle—classification of a vehicle that mounted the device.

15. The device of claim 11, wherein a receiving of the broadcast signal alert is performed through a cellular network interface and through the shared spectrum.

16. The device of claim 11, wherein the received attribute from the broadcasting device includes an emergency vehicle—classification, an active status of pursuing an emergency situation, a current location, and a target destination of the broadcasting device.

17. The device of claim 16, wherein the device establishes the V2V communication with the broadcasting device when a current location of the device is along a projected path of the broadcasting device that is travelling towards the target destination.

18. A computer-implemented method, comprising:
storing a first attribute including a media access control (MAC) address of a hearing aid—medical device that is in vehicle-to-passenger (V2 Pa) communication with a first device through a shared spectrum;
receiving a signal alert including a second attribute from a second device;
using the shared spectrum to forward the received signal alert to the hearing aid—medical device;
establishing a vehicle-to-vehicle (V2V) communication with the second device when the second attribute includes an emergency vehicle—classification and includes an active status of pursuing an emergency situation; and
comparing a bandwidth requirement of the V2V communication with an available bandwidth of the shared spectrum, wherein in response to the available bandwidth that is less than the bandwidth requirement:
aggregating a bandwidth of a licensed band with the available bandwidth of the shared spectrum; and
reallocating a currently used bandwidth of the shared spectrum to the V2V communication with the second device, wherein the reallocating of the currently used bandwidth is performed when a combination between the available bandwidth and the bandwidth of the licensed band is less than the bandwidth requirement of the V2V communication.

19. The computer-implemented method of claim 18, wherein the first device determines a projected path of the second device based upon the received second attribute from the second device, wherein the first device performs the V2V communication based upon the determined projected path.

20. The computer-implemented method of claim 18, wherein the first device periodically broadcasts the first attribute to indicate a handicap vehicle—classification of a vehicle that mounts the first device.

* * * * *